Jan. 2, 1951  H. SHOUB  2,536,101
PLASTIC STRAIN GAUGE
Filed July 23, 1948
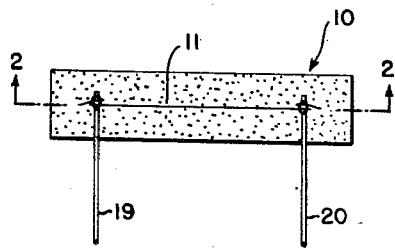
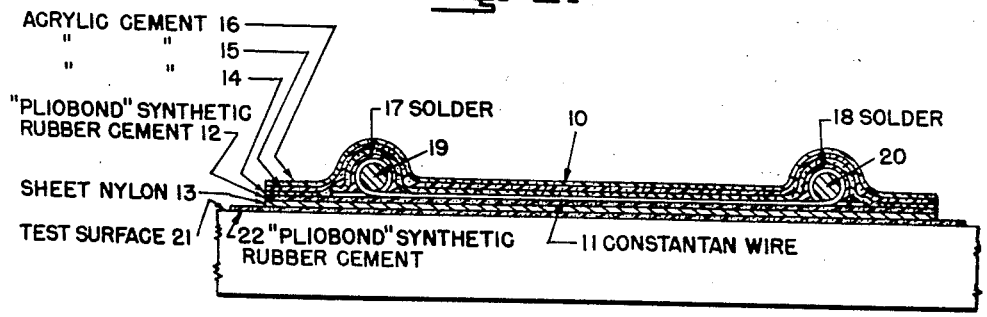
INVENTOR.
Harry Shoub
BY
ATTORNEY.

Patented Jan. 2, 1951

2,536,101

UNITED STATES PATENT OFFICE 2,536,101

PLASTIC STRAIN GAUGE

Harry Shoub, Washington, D. C., assignor to United States of America as represented by the Secretary of the Navy Application July 23, 1948, Serial No. 40,414

7 Claims. (Cl. 201—63)

(Granted under the act of March 3, 1883, as amended April 30, 1928; 370 O. G. 757)

The invention described herein may be manufactured and used by or for the Government of the United States of America for governmental purposes without the payment of any royalties thereon on therefor.

The invention relates to improvements in electric wire resistance strain gages of the type which can be cemented to a surface so that deformation of the surface will change the resistance of the gage.

The primary object of the present invention is to provide an electric wire resistance strain gage capable of measuring relatively large strains such as those in the plastic range of steel.

Another object of the invention is the provision of a wire resistance gage that is waterproof.

Other objects and many of the attendant advantages of this invention will be readily appreciated as the same becomes better understood by reference to the following detailed description when considered in connection with the accompanying drawings wherein:

Fig. 1 is a top plan view of the gage.

Fig. 2 is a central longitudinal sectional view substantially on the line 2—2 of Fig. 1 and showing the gage cemented to a test surface.

In the drawing, which for the purpose of illustration shows only a preferred embodiment of the invention and wherein like reference characters denote corresponding parts throughout the views, the numeral 10 generally designates the improved gage comprising a filament 11 bonded to a layer 12 of Pliobond cement covering a nylon sheet 13. The filament 11 is preferably bonded to the Pliobond layer 12 by a layer 14 and preferably two additional layers 15, 16 of Rohm and Haas B-7 acrylic resin cement which is formed of methyl methacrylate. The layer 12 of Pliobond cement is a combination of synthetic rubber cement which may be dissolved in a ketone such as methyl ethyl ketone or in ethyl acetate. The filament 11 preferably is formed of 1 mil specially-annealed constantan wire which is an alloy containing approximately 40 percent nickel and 60 percent copper. The nylon sheet 13 is 1 mil or less in thickness. In addition to its extensibility, nylon has the advantage of being unaffected by the solvents found is most cements, so much so that it is almost impossible to adhere it. It is a good insulator, is waterproof and stays flat and elastic after the Pliobond cement is applied.

The first step in making a gage is to prepare a small piece 13 of sheet nylon by brushing on a thin coat 12 of Pliobond cement. This is allowed to air-dry, one day being sufficient. The sheet 13 of nylon is then taped to a flat surface, coated side up. Care should be taken that the nylon is stretched smooth.

The filament 11 is soldered to the two leads 19, 20 with the leads held parallel to each other at the distance desired for the gage length, one inch of gage wire giving a resistance of about 25 ohms. The gage wire is stretched between the two bared leads and wrapped once around each. Several inches of gage wire should be left beyond each lead. Also the gage wire should be so placed on the leads that at least an inch of lead wire extends to either side of the gage wire. Soldering is most easily accomplished by use of a small iron, soldering salts, and coreless solder.

The gage element is then laid on the sheet 13 of nylon, and the loose ends are held with cellulose tape, the gage wire being stretched taut. Care must be exercised to prevent excessive stretching at this point as the ultimate extensibility of the wire can be greatly reduced. When the wire is in place, a thin coat 14 of B-7 acrylic cement is brushed over the whole gage. This is followed by two more applications 15, 16 on successive days. All the coats are air-dried. The acrylic cement forms a good bond for the very fine wire 11 as it dries quite hard. However it will not adhere to nylon. Fortunately it adheres remarkably to Pliobond cement and thus the use of Pliobond as a pre-coat is necessary.

When the last coat of cement has dried, the ends of the lead wires 19, 20 are carefully raised and pulled up toward the soldered joints 17, 18 leaving about ⅛ to ¼ inch of lead wire in the cement at each side of the joint. The gage is then cut from the base with a sharp blade, cutting through the extended ends of the gage filament beyond the leads but not cutting the leads themselves. The finished gage then comprises a piece of nylon, rectangular in shape having a length depending on the length of the gage filament which is disposed longitudinally of the backing material. At right angles to, and at opposite ends of the gage filament are the two lead wires.

The finished gage 10 is applied to a metal surface 21 under test by means of a layer 22 of Pliobond cement which has to be dried over a long period of time—one to three weeks on non-porous surfaces. The application of heat considerably speeds the drying process. When thoroughly dried, a gage made in the manner described reads a strain of 17 to 22 percent with an error of only several percent. Such a gage can of course only be used once.

In the specification and the claims, the word

"nylon" is used to mean a high molecular weight synthetic linear condensation polymerization product of a carboxylic acid and its aminated derivatives characterized by capability of formation in thin smooth sheets and possession of a plastic range of up to at least 22% before rupture. The word "Pliobond" is used to mean butadiene-1,3-acrylonitrile rubbery copolymer and phenol formaldehyde resin, with a conventional curing agent for the rubbery copolymer plus a solvent such as methyl ethyl ketone.

Obviously many modifications and variations of the present invention are possible in the light of the above teachings. It is therefore to be understood that within the sscope of the appended claims the invention may be practiced otherwise than as specifically described.

I claim:

1. In an electric wire resistance strain gage for use in measuring plastic deformation and the like, a wire filament of a material having a low electrical coefficient of resistance, and a base on which the filament is bonded including a thin sheet of nylon, all the components of said gage being formed of materials capable of withstanding strains of the order of 17% to 22%.

2. In an electric wire resistance strain gage for use in measuring plastic deformation and the like, a thin sheet of nylon, a layer of Pliobond cement on the nylon sheet, and a wire filament having a low coefficient of electrical resistance bonded to said layer of cement, all the components of said gage being formed of material capable of withstanding strains of the order of 17% to 22%.

3. In an electric wire resistance strain gage for use in measuring plastic deformation and the like, a wire filament, a thin sheet of nylon, a layer of Pliobond cement on the nylon sheet, and a layer of acrylic cement formed of methyl methacrylate protectively covering the filament and securing it to the Pliobond layer, all the components of said gage being formed of materials capable of withstanding strains of the order of 17% to 22%.

4. In an electric wire resistance strain gage for use in measuring plastic deformation of a structural surface, a constantan wire filament, a nylon sheet of smooth plastic material capable of stretching under tension to at least 22% of its unstretched length, a layer of Pliobond cement on the nylon sheet, a layer of acrylic cement formed of methyl methacrylate bonding the filament to the Pliobond layer, and a layer of Pliobond cement bonding the nylon sheet to the structural surface, all the components of said gage being formed of materials capable of withstanding strains of the order of 17% to 22%.

5. In an electric wire resistance strain gage for use in measuring plastic deformation of a structural surface, a constantan wire filament, a nylon sheet characterized by a smooth surface, electrical insulation, a uniform thickness of the order of one mil and susceptibility to stretching under tension to at least 22% of its unstretched length, a layer of Pliobond cement on the nylon sheet, a layer of acrylic cement formed of methyl methacrylate bonding the filament to the Pliobond layer, and a layer of Pliobond cement bonding the nylon sheet to the structural surface, all of the components of said gage being formed of materials capable of withstanding strains of the order of 17% to 22%.

6. An electric wire resistance strain gage for use in measuring plastic deformation and the like, comprising a wire filament having a low temperature coefficient of electrical resistance, a smooth water-proof nylon support sheet for said filament, a cement adherent to said sheet for forming a backing on said sheet, a bonding element on said filament and cement for holding said filament in firm engagement with said cement, and means for bonding the sheet to a workpiece.

7. In an electric wire resistance strain gage for use in measuring plastic deformations and the like, a wire filament, a base including a thin sheet of nylon, and cement means for bonding the filament to said base, said filament, sheet and cement means being extensible without rupture to at least 22% of their unstretched length.

HARRY SHOUB.

REFERENCES CITED

The following references are of record in the file of this patent:

UNITED STATES PATENTS

| Number | Name | Date |
|---|---|---|
| 2,292,549 | Simmons | Aug. 11, 1942 |
| 2,415,082 | Burr | Feb. 4, 1947 |
| 2,427,979 | Sorensen | Sept. 23, 1947 |
| 2,439,369 | Nicol | Apr. 6, 1948 |

FOREIGN PATENTS

| Number | Country | Date |
|---|---|---|
| 464,688 | Great Britain | Apr. 21, 1937 |

OTHER REFERENCES

Bridgwater, "Synthetic Substances with Rubber-Like Properties," October 1938, pages 735–737 of Mechanical Engineering.

De Forest, Characteristics of Aircraft Applications of Wire Resistance Strain Gages, pages 112–114, vol. 15 of "Instruments," April 1942.